C. J. HOLUB.
PIPE.
APPLICATION FILED JAN. 23, 1912.

1,067,172.

Patented July 8, 1913.

Witnesses
Oliver B. Kaiser
C. B. Foster

Inventor
Charles J. Holub
By Wood & Wood
Attorneys

UNITED STATES PATENT OFFICE.

CHARLES J. HOLUB, OF NEWPORT, KENTUCKY, ASSIGNOR TO THE PECK-WILLIAMSON COMPANY, OF CINCINNATI, OHIO, A CORPORATION OF OHIO.

PIPE.

1,067,172.  Specification of Letters Patent.  Patented July 8, 1913.

Application filed January 23, 1912. Serial No. 672,973.

*To all whom it may concern:*

Be it known that I, CHARLES J. HOLUB, a citizen of the United States, residing at Newport, in the county of Campbell and State of Kentucky, have invented certain new and useful Improvements in Pipes, of which the following is a specification.

My invention relates to an improvement in pipes, and primarily to that class known as hot air conductor pipes used in connection with furnaces for heating purposes.

The object of my invention is to provide means for automatically clamping or locking two sections of pipe together at their meeting or telescoping ends.

Another object of my invention is to provide locking means comprising two members, one on either end of a pipe section disposed at one side of the central vertical plane of the pipe so that the sections may be nested with the planes of the locking members out of locking registry.

The features of my invention will be more fully set forth in the description of the accompanying drawings forming a part of this specification, in which:—

Figure 1:
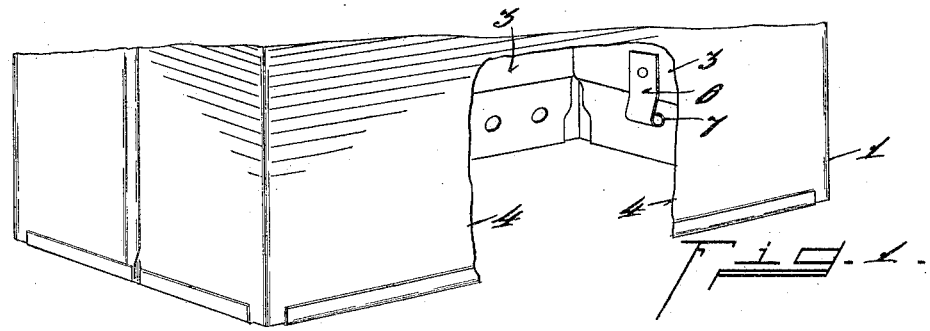
Figure 2:
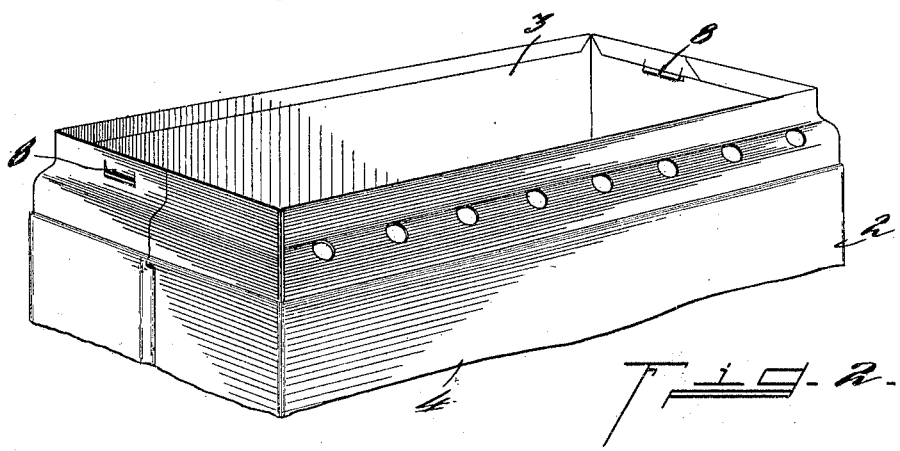
Figure 3:
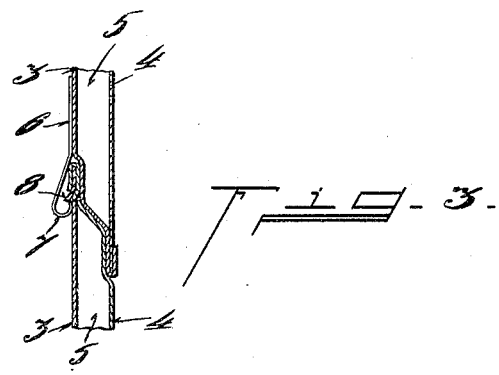

Figure 1 is a perspective view of a portion of the pipe length, with a part thereof broken away to expose the interior. Fig. 2 is a perspective view of a portion of the pipe length illustrating the opposite end to that of Fig. 1, or the end of a second length, adapted to telescopically register, with the receiving end of a pipe length, as shown in Fig. 1. Fig. 3 is a sectional view of a portion of two pipe sections united and locked together.

In the drawings, I have illustrated furnace hot air conductor piping of double wall formation, of a type having an intermediate air space between the walls, but it is obvious that my improvement is equally adaptable to a single walled pipe.

1, 2, represent pipe sections or lengths having their ends arranged to telescopically united with each other, and of rectangular form, with each section formed of inner and outer walls 3, 4, respectively, inclosing an air space 5. The inner and outer walls of each section are united at their ends, and arranged in each length to provide an outer taper from the inner wall to the outer at one end, and a reverse taper at the opposite end of the length, that is, the outer wall tapers toward the inner. This enables the telescopic uniting of adjacent sections to maintain a plan surface of both inner and outer walls of a series of united sections or lengths. This also forms a rigid interlock, and very satisfactorily seals the joints. It is obvious that this form of pipe length is old in the art, and I do not wish to be limited herein to the application of my improvement to the particular type of pipe length herewith illustrated.

6 represents an elastic strip or lock member fixed to the interior side wall, and at one end of a length and preferably at such end where the inner wall tapers outwardly in joining with the outer wall. The free end of the lock member is provided with a hook bend 7, adapted to engage with the edge of a folded lap, or ridge protruding from the inner wall of a second length.

As illustrated in Figs. 2 and 3 such catch or ridge 8 is formed by punching the walls of one length and bending the same inward. Thus, as two lengths are united and pressed together, the lock member 6 will engage with the ridge or catch 8 and its hook bend engage over the end of such ridge, automatically locking the two lengths together and prevent displacement or separation. As the latch or lock member is provided on the interior of the pipe lengths, it will be seen that it is practically impossible to disengage the lengths when once united, unless access can be had to the interior to pry apart the locking connections.

As illustrated, the lengths are provided with two oppositely disposed locking elements, but it is obvious that any number may be employed as desired. In providing one end of the pipe length with the inwardly projecting ridges and the opposite end with the latch members, a standard form of construction is had, eliminating special fitting and enabling interchangeability of lengths.

It will be noted that the locking elements are disposed at one side of the central vertical plane of the pipe section. This is for the purpose of permitting the sections to be nested for shipping, with the planes of the companion locking elements out of registry to prevent the sections from locking.

Having described my invention, I claim:—

A rectangular hot air conductor pipe, comprising two sections, projecting lugs at one end of each section disposed at one side of the central vertical plane of the section, and lock members at the opposite end of each section disposed at one side of the central vertical plane of the section and adapted to automatically engage with the lugs of an adjacent section when the sections are brought into telescopic engagement with the plane of said lock member in registry with the plane of the lugs.

In testimony whereof, I have hereunto set my hand.

CHARLES J. HOLUB.

Witnesses:
 OLIVER B. KAISER,
 CLARENCE B. FOSTER.

Copies of this patent may be obtained for five cents each, by addressing the "Commissioner of Patents, Washington, D. C."